(12) United States Patent
Mikaelsson et al.

(10) Patent No.: US 6,308,971 B1
(45) Date of Patent: Oct. 30, 2001

(54) RIGID AXLE MOUNTING FOR A VEHICLE

(75) Inventors: Peter Mikaelsson, Södertälje; Anders Gustavsson, Gnesta, both of (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/529,820
(22) PCT Filed: Aug. 24, 1999
(86) PCT No.: PCT/SE99/01435
  § 371 Date: Apr. 19, 2000
  § 102(e) Date: Apr. 19, 2000
(87) PCT Pub. No.: WO00/12332
  PCT Pub. Date: Mar. 9, 2000

(30) Foreign Application Priority Data

Aug. 26, 1998 (SE) .................................................. 9802838

(51) Int. Cl.[7] .................................................... B60G 9/02
(52) U.S. Cl. .............................. 280/124.107; 280/124.17; 280/124.175
(58) Field of Search ........................ 280/124.1, 124.106, 280/124.107, 124.164, 124.17, 124.175, 124.128, 124.153

(56) References Cited

U.S. PATENT DOCUMENTS

| 2,865,652 | * 12/1958 | Easton . |
| 4,084,838 | 4/1978 | vor der Bruck et al. . |
| 6,129,367 | * 10/2000 | Bublies et al. ................ 280/124.107 |

FOREIGN PATENT DOCUMENTS

| 19521874 | 12/1996 | (DE) . |
| 4-159110 | 6/1992 | (JP) . |

* cited by examiner

Primary Examiner—Paul N. Dickson
(74) Attorney, Agent, or Firm—Ostrolenk, Faber, Gerb & Soffen, LLP

(57) ABSTRACT

The present invention relates to a suspension element for a rigid wheelshaft of a vehicle. The suspension element is connected pivotably to the wheelshaft by two connections and is connected pivotably to the vehicle's framework by two connections. The suspension element is designed to prevent movement of the wheelshaft in longitudinal and transverse directions and to provide a stabilizing effect. The suspension element is composed of two separate elongate elements which are designed to be held together by at least one separate connecting device.

12 Claims, 2 Drawing Sheets

RIGID AXLE MOUNTING FOR A VEHICLE

STANDPOINT OF THE INVENTION, AND STATE OF THE ART

The present invention relates to a suspension element for a rigid wheelshaft of a vehicle.

Conventional rigid wheelshafts are usually suspended in vehicles by means of upper and lower reaction rods which extend in the longitudinal direction of the vehicle, and transverse reaction rods. Such reaction rods each have a first end pivotably connected to the wheelshaft and a second end pivotably connected to the vehicle's framework. The reaction rods are designed to prevent wheelshaft movement in longitudinal and transverse directions relative to the vehicle's framework. In cases where the wheelshaft springing devices consist of pneumatic springing devices, a stabiliser is also arranged between the wheelshaft and the vehicle's framework.

DE 195 21 874 refers to a suspension element for a rigid wheelshaft of a vehicle. The known suspension element is pivotably connected to the wheelshaft by two connections and pivotably connected to the vehicle's framework by two connections. The suspension element is designed to prevent wheelshaft movement in longitudinal and transverse directions relative to the vehicle's framework and to provide a stabilising effect. Such a suspension element makes it possible for the transverse reaction rods of a conventional rigid wheelshaft suspension to be superfluous, as also any stabiliser. The suspension element is manufactured in one piece but such construction makes it expensive to manufacture.

SUMMARY OF THE INVENTION

The object of the present invention is to provide a suspension element of the kind mentioned in the introduction which can replace the transverse reaction rods and any stabiliser in a conventional wheelshaft suspension and can at the same time be manufactured at low cost.

This object is achieved by the suspension element mentioned in the introduction which is comprised of two separate elongate elements held together by at least one separate connecting device. A suspension element comprised of two separate inherently uncomplicated elongate elements joined together by a separate connecting device which itself may likewise be of inherently simple construction makes it possible to manufacture at low cost a suspension element of the aforesaid kind.

According to a preferred embodiment of the invention, the elongate elements are so directed as to cross one another in the fitted state. This means that the elongate elements are of substantial diagonal extent relative to the vehicle. As the elongate elements are rigid in their longitudinal direction and are held together by a connecting device, the suspension element will form a rigid element in an extension plane, thereby effectively preventing wheelshaft movement in longitudinal and transverse directions. The elongate elements preferably cross in a region situated substantially at the middle of the elongate elements. This means that the connections of the elongate elements to the wheelshaft and the framework, i.e. the vehicle's two frame side members, can absorb in a substantially symmetrical manner the forces that act upon the wheelshaft. The connecting device is preferably designed to connect the elongate elements to one another in the region where they cross. Arranging the connecting device in this region is very advantageous, since the elongate elements are essentially in contact with one another there, which means that the connecting device inherently need not incorporate a structure which bridges over the distance between the elongate elements, so it can be of simple construction. Such a connecting device may in its simplest form be a bolt extending through a hole arranged through the two elongate elements in the region where they cross.

According to another preferred embodiment, said elongate elements are resilient in the vertical direction. Such resilient characteristics in the vertical direction make it possible to achieve a suspension element which has a stabilising effect on the wheelshaft relative to the vehicle's framework. Such elongate elements preferably take the form of conventional leaf springs. Conventional leaf springs are substantially rigid in their longitudinal direction and usually exhibit such thickness in a first transverse direction as to be also substantially rigid in that transverse direction. They nevertheless exhibit a substantially small thickness in a second transverse direction which is substantially perpendicular to the first transverse direction, or in the vertical direction, thereby being resilient in this second direction. Advantageously, the thickness of the leaf springs in the vertical direction is greatest in the central portion of the leaf springs. This provides the suspension element with a mainly rigid central portion so that said connecting device is not subject to springing movements which might adversely affect the retaining capacity of the connecting device. The thickness of the leaf springs may decrease continuously from said central portion to their ends. The thickness of the leaf springs in the vertical direction will thus be least at their ends and said springing movements will therefore be greatest at the pivotable connections of these ends to the wheelshaft and the vehicle's framework. Conventional leaf springs with a thickness in the vertical direction which decreases along a substantially parabolic path from said central portion to the ends may thus be used. Such leaf springs are manufactured in large quantities and may be purchased at a favorable price.

According to another preferred embodiment of the invention, the design of the connecting device is such that it forms a closed structure which extends round the elongate elements at said connection point. This makes it possible to achieve a very secure connection between said elongate elements, which therefore do not risk being moved sideways relative to one another. Such a connecting device may incorporate an upper device and a lower device connectable to one another by means of at least two fastening elements directed substantially vertically. Said upper and lower devices may be flat-shaped, in which case the upper flat-shaped device abuts against the top of the elongate element arranged uppermost and the lower flat-shaped device abuts against the underside of the elongate element arranged lowest. These flat-shaped devices may be provided with holes designed to accommodate throughbolts whereby tightening of said bolts brings said flat-shaped devices towards one another until a sufficient clamping force is achieved to hold the elongate elements securely together.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE PRESENT INVENTION

Figure 1:
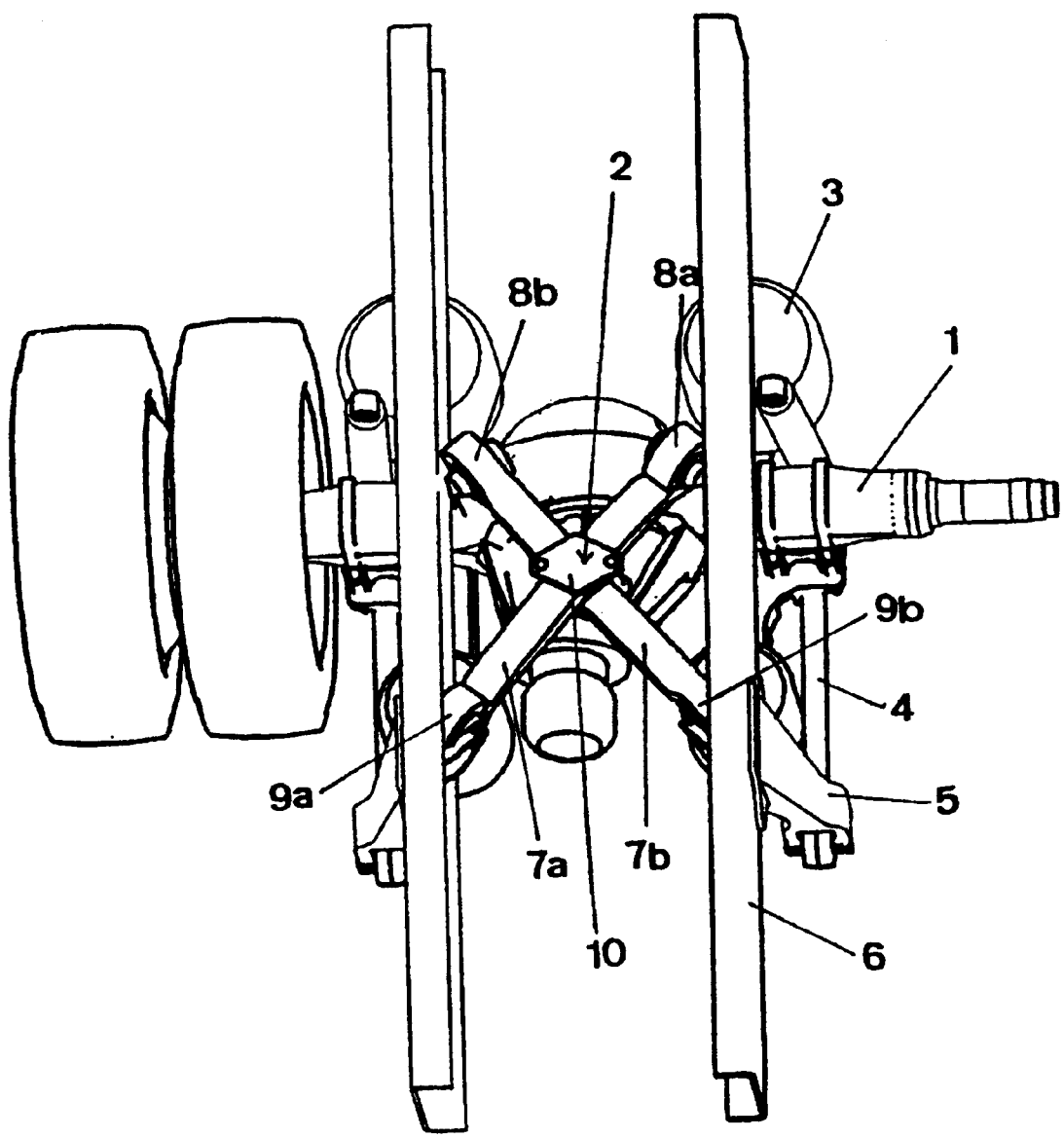
FIG. 1 shows a view from above of a rigid wheelshaft of a vehicle, which wheelshaft is suspended by a suspension element according to the present invention.

FIG. 1 depicts a rigid wheelshaft 1 of a vehicle, which wheelshaft 1 is suspended by a suspension arrangement which incorporates a suspension element 2 according to the present invention. The suspension element 2 is designed to replace the upper longitudinal reaction rods and the transverse reaction rods which are usual in conventional suspension arrangements for rigid wheelshafts 1. The suspension arrangement for the wheelshaft 1 incorporates pneumatic springing devices 3 which in conventional suspension arrangements require the provision of a stabiliser, as pneumatic springing devices 3 do not provide a stabilising effect on the wheelshaft 1 in the manner in which, for example, leaf springs act. The present suspension element 2 may thus obviate a stabiliser. However, the suspension arrangement incorporates not only the suspension element 2 but also two lower longitudinal reaction rods 4. These longitudinal reaction rods 4 each incorporate first ends which are pivotably connected to the vehicle's framework by fastening devices 5 which extend downwards from the vehicle's framework, i.e. from each of the vehicle's frame side members 6, and second ends which are pivotably connected to the wheelshaft 1. Said lower reaction rods 4 are arranged substantially vertically below each of the side frame members 6 and extend substantially parallel with the latter. The suspension element 2 incorporates two elongate elements in the form of two identical bar-shaped elements which are elastic in the vertical direction and take the form of leaf springs 7a,b which are arranged substantially at the point where the conventional upper longitudinal reaction rods are usually placed. The leaf springs 7a,b are directed so that they cross one another and incorporate first ends, which are pivotably connected by connections 8a,b to the wheelshaft 1, and second ends which are pivotably connected by second connections 9a,b to the vehicle's frame side members 6. The leaf springs 7a,b cross at a portion situated substantially centrally between the ends of the leaf springs 7a,b. A connecting device 10 is designed to hold the leaf springs 7a,b together in the region where they cross.

Figure 2:
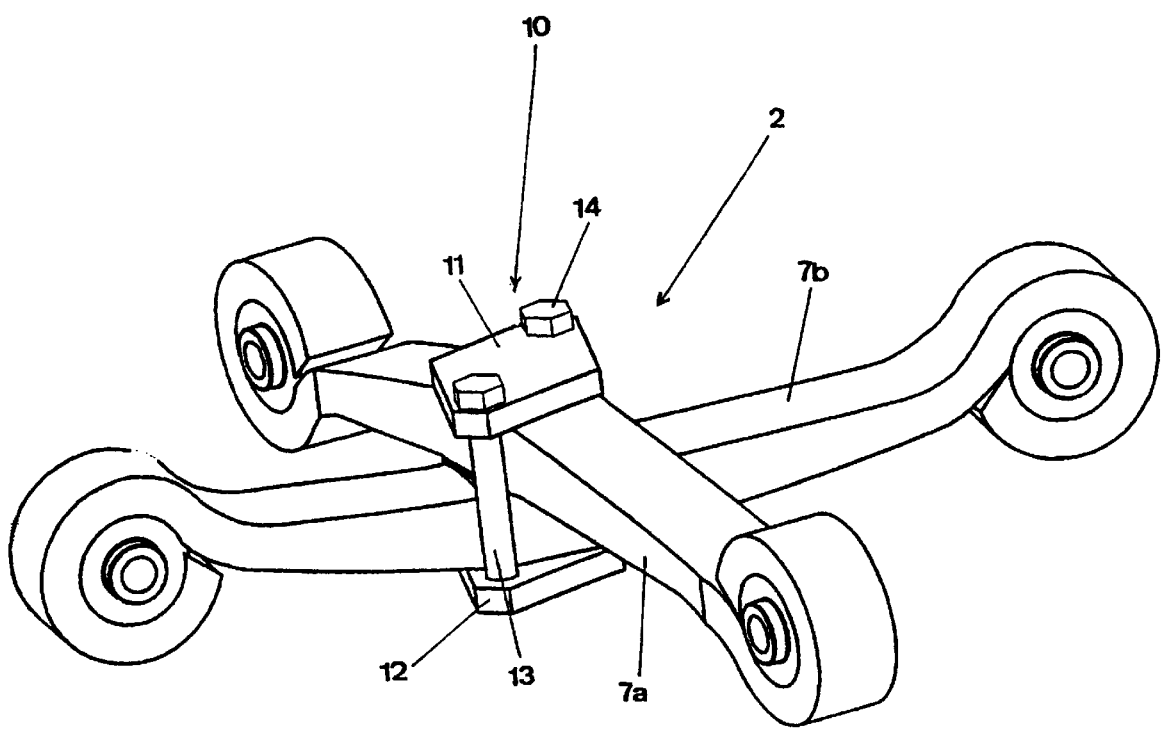
FIG. 2 shows a perspective view of a suspension element according to the present invention.

FIG. 2 shows the composition of the suspension element 2 in more detail. It comprised of two identical elongate bar-shaped elements or leaf springs 7a,b which are held together at their central portions by a connecting device 10. The thickness of the leaf springs 7a,b in the vertical direction is greatest at the central portions, which means that the leaf springs are substantially rigid in the region of the connecting device 10 and exhibit almost no springing capacity there. The thickness of the leaf springs 7a,b decreases substantially continuously from said central portion to their ends, which means that resilient movements of the leaf springs 7a,b occur mainly at the ends of the leaf springs 7a,b. The leaf springs 7a,b exhibit in their longitudinal direction a substantially rigid construction and have a thickness in their horizontal transverse direction which causes the leaf springs 7a,b to be substantially rigid in that direction too. The suspension element 2 comprised of the leaf springs 7a,b and the connecting device 10 thus effectively prevents the wheelshaft 1 from moving horizontally in longitudinal and transverse directions of the vehicle. However, the suspension element 2 does not prevent movement of the wheelshaft 1 in the vertical direction, but it does provide a stabilising effect on the wheelshaft 1 owing to the connections 8a,b, of the suspension element 2 to the wheelshaft being resiliently restrained relative to one another.

The connecting device 10 is arranged in the region where the leaf springs 7a,b cross, and comprises an upper flat-shaped device 11 and a lower flat-shaped device 12. The upper flat-shaped device 11 is arranged on top of the upper leaf spring 7a, while the lower flat-shaped device 12 is arranged on the underside of the lower leaf spring 7b. Said flat-shaped devices 11,12 each have two corresponding overlying holes to accommodate two bolts 13,14 extending vertically, and the holes in the lower flat-shaped device 12 preferably incorporate threads so that said flat-shaped devices 11, 12 can be clamped against the leaf springs 7a,b. Such a connecting device 10 provides a simple but nevertheless secure and stable connection for the leaf springs 7a,b.

The advantage of the suspension element 2 described above is primarily that it can be made of two relatively inexpensive leaf springs 7a,b which can easily be connected to one another by means of a simple connecting device 10. Such a suspension element 2 can therefore be produced at little cost.

The present invention is in no way limited to the embodiment described above but may be varied freely within the scopes of the patent claims. For example, said separate elongate elements may also be arranged parallel with one another. In that case, said elongate elements arranged parallel may be connected by, for example, two transverse connecting devices.

What is claimed is:

1. Suspension element for a rigid wheelshaft of a vehicle, comprising
   two separate elongate elements, the elongate elements are resilient in the vertical direction of the vehicle and the elongate elements incorporate respective leaf springs, and at least one separate connecting device holding the elongate elements together;
   a respective first connection by pivotably connecting each elongate element to the wheelshaft and a respective second connection by pivotably connecting each elongate element to the vehicle framework, whereby the suspension element prevents movement of the wheelshaft in longitudinal and transverse directions and provides a stabilizing effect for the wheelshaft.

2. Suspension element according to claim 1, wherein the two elongate elements are respectively directed so that they cross.

3. Suspension element according to claim 2, wherein each elongate element has a middle along its length and the elongate elements cross substantially at the middle of each elongate element.

4. Suspension element according to claim 2, wherein the connecting device connects the elongate elements to one another where they cross.

5. Suspension element according to claim 1, wherein the thickness of each leaf spring in the vertical direction is greatest at the middle along the length of the leaf spring.

6. Suspension element according to claim 5, wherein the thickness of the leaf spring decreases substantially continuously from its middle to its ends.

7. Suspension element according to claim 1, wherein the connecting device extends around the elongate elements.

8. Suspension element according to claim 7, wherein the connecting device includes an upper and a lower flat-shaped device which are connectable to one another, and at least two fastening elements directed substantially vertically for connecting the elongate elements.

9. Suspension element according to claim 1, wherein the first connections are at first ends of the elongate elements and the second connections are at second ends of the elongate elements.

10. Suspension element according to claim 9, wherein the two elongate elements are respectively directed so that they cross and the connecting device connects the elongate elements to one another where they cross.

11. Suspension element according to claim 10, wherein the elongate elements are resilient in the vertical direction.

12. In combination, a suspension element as in claim 11, a vehicle framework, and a rigid wheelshaft at the framework;

an arm connecting the framework to the wheelshaft via a rod extending longitudinally along the framework;

the first connections are to the wheelshaft and the second connections are to the framework; and the elongate elements extending diagonally across the longitudinal direction.

\* \* \* \* \*